US 6,636,467 B1

(12) United States Patent
Taussig (10) Patent No.: US 6,636,467 B1
(45) Date of Patent: Oct. 21, 2003

(54) METHOD AND APPARATUS FOR ACCURATELY CALIBRATING THE TIMING OF A WRITE ONTO STORAGE MEDIA

(75) Inventor: Carl P. Taussig, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 130 days.

(21) Appl. No.: 09/608,600

(22) Filed: Jun. 30, 2000

(51) Int. Cl.[7] .......................................... G11B 7/0045
(52) U.S. Cl. ................ 369/47.3; 369/53.34; 369/59.14; 369/59.2
(58) Field of Search .......................... 369/47.28, 47.3, 369/53.34, 59.14, 59.2

(56) References Cited

U.S. PATENT DOCUMENTS

| | | | | |
|---|---|---|---|---|
| 4,009,490 A | * | 2/1977 | Fassbender | 360/45 |
| 5,559,778 A | | 9/1996 | Tsukatani | |
| 5,677,802 A | * | 10/1997 | Saiki et al. | 360/51 |
| 6,026,214 A | * | 2/2000 | Nagumo | 369/113 |
| 6,046,969 A | * | 4/2000 | Towner et al. | 369/48 |
| 6,101,154 A | * | 8/2000 | Kim | 369/13 |
| 6,101,158 A | * | 8/2000 | Hogan | 369/47 |
| 6,178,148 B1 | * | 1/2001 | Shoji et al. | 369/48 |
| 6,252,838 B1 | * | 6/2001 | Kuroda et al. | 369/47.28 |
| 6,332,205 B1 | * | 12/2001 | Conway | 714/746 |
| 6,445,656 B1 | * | 9/2002 | Koide | 369/47.28 |
| 6,477,127 B1 | * | 11/2002 | Osada et al. | 369/59.25 |

FOREIGN PATENT DOCUMENTS

| | | |
|---|---|---|
| EP | 0322817 A | 7/1989 |
| EP | 0930617 A | 7/1999 |
| EP | 0962930 A | 12/1999 |
| EP | 0997893 A | 5/2000 |

* cited by examiner

*Primary Examiner*—W. R. Young
*Assistant Examiner*—Gautam R. Patel (57) ABSTRACT

The write-timing calibration involves (1) writing a calibration data sequence referenced to a physical timing clock (such as a wobble clock on a DVD disk), (2) measuring the timing offset or phase offset between the calibration data sequence and the clock, (3) writing a test data sequence using the same or a different recording device, (4) measuring the timing offset or phase offset between the test data and the clock, (5) comparing the timing offsets of the calibration and test data sequences, with respect to the clock, (6) iteratively adjusting the timing of the beginning of the write process, and repeating steps (3), (4) and (5) until the timing offsets are equal to within a defined tolerance, and (7) Adjusting the delay of the write driver relative to the clock by the amount determined in step (6), for equal timing offsets of the calibration and test data sequences. This process calibrates the timing of bits written on DVD formats by different recording devices so that the start position of edited data sequences is repeatably collocated with previous data sequences to a precision better than +/−0.06 μm.

20 Claims, 8 Drawing Sheets

METHOD AND APPARATUS FOR ACCURATELY CALIBRATING THE TIMING OF A WRITE ONTO STORAGE MEDIA

BACKGROUND OF THE INVENTION

Many information storage systems include a disk shaped storage medium and a playback (read) and record (write) element. This read-write element (hereinafter "head") is proximal to a disk surface, and can be scanned to select a radial position on the disk. The disk spins rapidly beneath the (effectively stationary) head. This enables rapid reading or writing of information on nearly circular bit tracks that cover most of the disk surface. Some types of storage media, such as DVD and CD disks, can be recorded in advance by injection molding the disk with a permanent bit sequence, so that a read-only (ROM) disk is produced.

Figure 1:
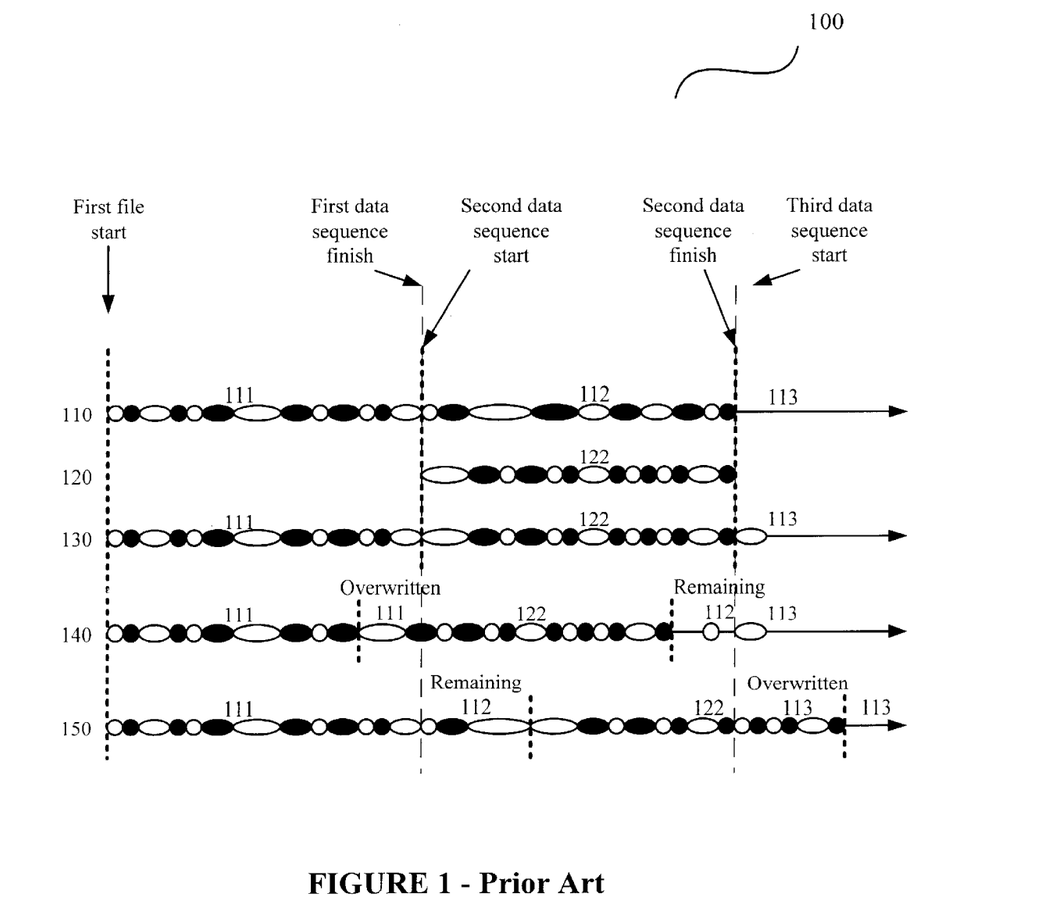
FIG. 1 illustrates data strings in DVD-ROM format.

A common DVD-ROM format stores a series of files or data sequences as a continuous data string. FIG. 1 illustrates such a data string 110, which includes a first data sequence 111 followed without delay by a second data sequence 112, a third data sequence 113, and others not shown. This format is convenient for reading of pre-recorded data sequences (i.e. files).

Bits may also be recorded by a head, on re-writable media. With re-writable media, it is desirable to be able emulate the DVD-ROM format, and also be able to replace a specified data sequence within a data string, such as second data sequence 112; with another data sequence, such as new second data sequence 122. The desired result of this edit is edited data string 130. Edited data string 130 has old second data sequence 112 replaced by new data sequence 122, while data sequences 111 and 113 are unchanged.

Unfortunately, the DVD-ROM format has no mechanism to accurately time the beginning of the over-write process for an edit. Thus, there is often a timing error, Δt, in the writing of a new second data sequence 122. The data sequences pass rapidly beneath the head, at a velocity, v, that may be radius dependent and is given by the following equation.

$$v = x/t \sim 3.5\text{--}8.8 \text{ m/s}, \quad (1)$$

where "x" is the distance along the track and "t" is time. Thus, the timing error, Δt, corresponds to a position error, Δx, given by the following equation.

$$\Delta x = v^* \Delta t. \quad (2)$$

When the write process for new data sequence 122 begins too early, it writes over part of first data sequence 111, as shown in data string 140. Furthermore, part of old second data sequence 112 remains. Similarly, when the write-timing of new data sequence 122 is delayed, the beginning of third data sequence 113 is erased and the beginning of old second data sequence 112 remains, as shown in data string 150.

Thus, the standard DVD-ROM format has the disadvantage that it does not accurately edit data sequences. The edited data sequence is not completely replaced by the new data sequence, and nearby data sequences can be damaged or erased. There is a strong motivation to design a re-writable DVD format that emulates the DVD-ROM format because then the existing installed base of DVD players and DVD-ROM readers can read the re-writable DVD disk. Hence, there is a need in the art for a method to accurately synchronize new edited data with the existing data on the disk. This method should accurately position recorded data sequences in order to repeatably write and read information. This method should (1) precisely control the time and distance between the data sequence start positions and well defined locations on the disk, (2) precisely position and accurately calibrate the beginning of the write process with the data sequence start position, (3) consistently calibrate the beginning of the write process, independent of which recording device is used, and (4) compatibly operate with prior DVD technology.

SUMMARY OF THE INVENTION

This disclosure is directed towards a method and apparatus for calibrating write timing of recorded information.

The calibration involves (1) writing a calibration data sequence referenced to a timing clock including positions marked on the disk (such as a wobble clock on a DVD disk), (2) measuring the timing offset or phase offset between the calibration data sequence and the clock, (3) writing a test data sequence using the same or a different recording device, (4) measuring the timing offset or phase offset between the test data sequence and the clock, (5) comparing the timing offsets of the calibration and test data sequences, with respect to the clock, (6) Iteratively adjusting the timing of the beginning of the write process, and repeating steps (4) and (5) until the timing offsets are equal to within a defined tolerance, and (7) Adjusting the delay of the write head relative to the clock by the amount determined in step 6.

This process calibrates the timing of bits written on DVD+RW disks by different recording devices so that the start position of edited data sequences is repeatably collocated with previous data sequences to a precision better than +/−0.06 μm.

These and other objects, features, and advantages of the present invention will be apparent from the included drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION OF THE INVENTION

An accurate method to calibrate the timing of the "write" process in a recording system is disclosed. This method is described with reference to digital video disk (DVD) information storage technology, but is also applicable to calibrating the timing of processes in other storage technologies.

The detailed description is presented in four sections. Section I presents an embodiment of the invention's data and recording formats. Section II presents an embodiment of a method for calibrating the timing offset between the write process used to edit data and that previously used to record data. Section III presents an embodiment of a method for measuring the timing offset between recorded data and a clock. Section IV presents an embodiment of measuring the timing offset between data and the clock.

I. An Embodiment of the Data and Recording Formats

Figure 2:
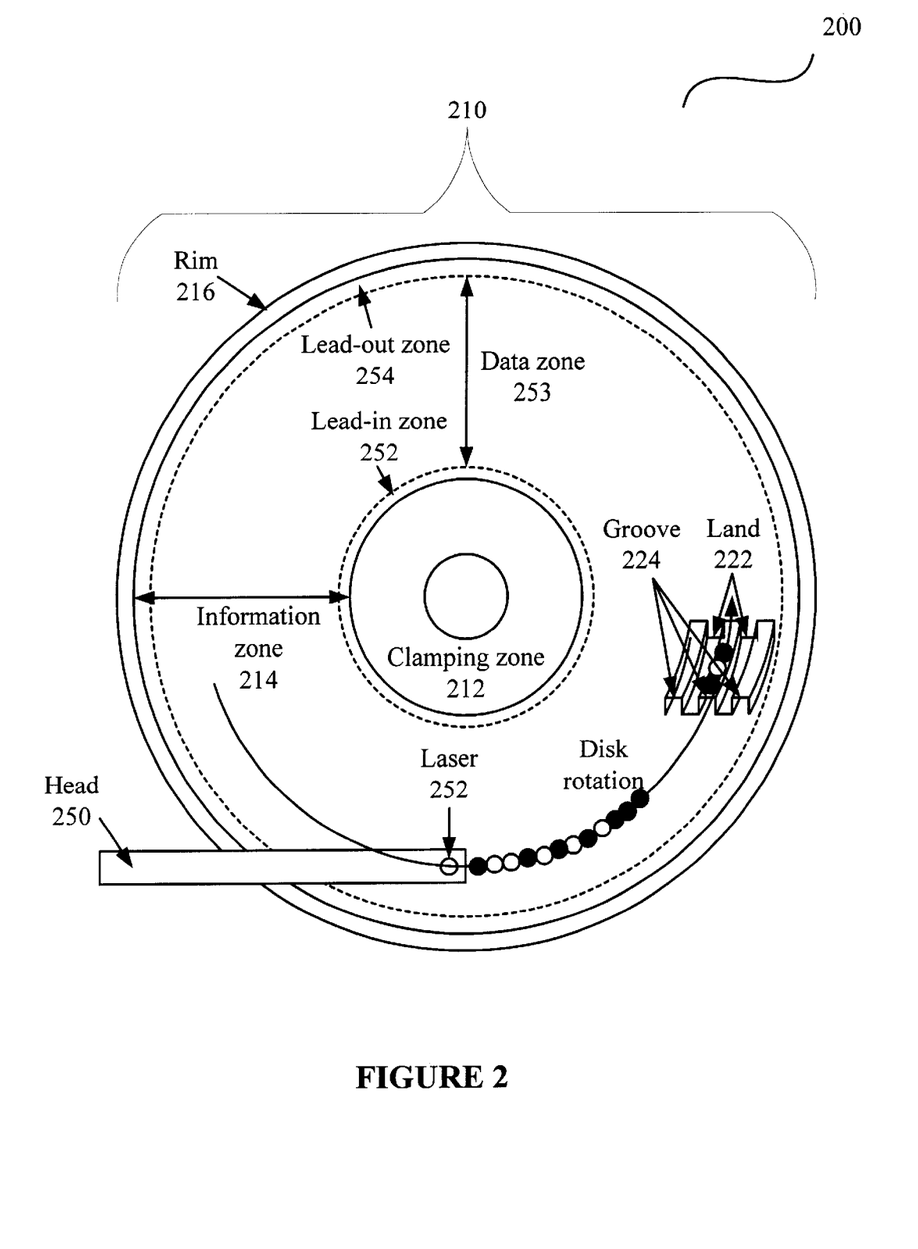
FIG. 2 illustrates information storage in DVD+RW format.

FIG. 2 illustrates information storage on re-writable DVD. A DVD system 200 includes a DVD disk 210 and a recorder including a head 250.

The DVD disk 210 includes a clamping zone 212, an information zone 214, and a rim region 216. Bits 218 of information are recorded in the information zone 214, which consists of a spiral pattern of alternating land 222 and groove 224 regions. A bit 218 is defined by a high or low reflectivity where it is written. Bits 218 are recorded in the groove regions 224, forming spiral tracks containing sequences of bits. A sequence of bits (a data sequence) is shown as a sequence of black and white regions in FIG. 2.

The head 250 includes a servo system that positions the head 250 radially, at a constant height above a selected track, a laser 252, a light sensor and electric circuitry.

In the read process, the head laser 252 shines a laser beam on the disk track that passes beneath it. A bit 218 is sensed from the amount of reflected light from the bit that reaches the head sensor.

To record or "write" data, more intense laser light is used to change the local structural properties of the disk material, and hence its reflectivity. Writing a data sequence of bits 218 is achieved by rapidly changing the laser 252 power as the disk passes beneath, to change the reflectivity of selected regions of a disk groove 224. By this method, data sequences can be recorded in a data format of the invention.

Figure 3:
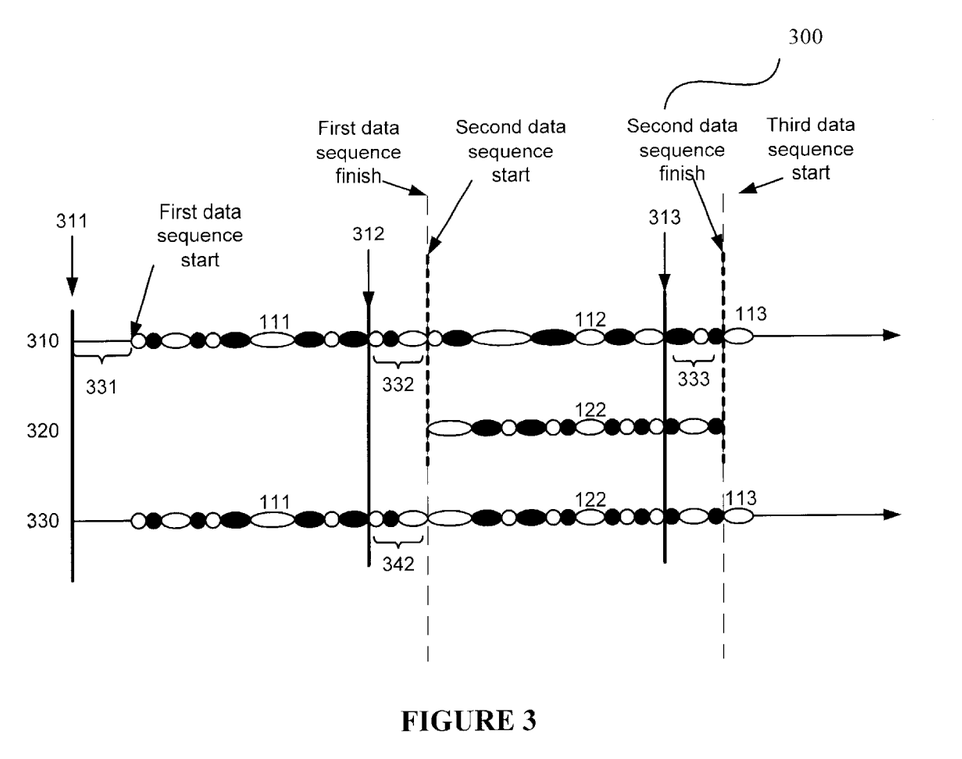
FIG. 3 illustrates data strings in DVD+RW format.

FIG. 3 illustrates a data format of the invention. Data string 310 includes first data sequence 111, second data sequence 112, third data sequence 113, and data address markers 311, 312 and 313. Data string 310 can be formed as follows.

When a recording head (e.g. head 250) passes over an address marker 311, the time of the event is sensed by a "clock channel", as will be described in detail in Section II. The head then begins the process to write first data sequence 111. This write process may be delayed (e.g. purposely or by the speed of the head's clock channel electronics), giving a time and position offset 331 between the address marker 311 and the start of the first data sequence 111. The bits 218 in data sequence 111 are then written exactly as in data string 110 of FIG. 1. Like data string 110, second data sequence 112 of data string 310 begins immediately thereafter. The length of the data sequences is such that the position offset 332 between the address marker 312 and the start of the first data sequence 112 is equal to position offset 331. This relationship is repeated for third and subsequent data sequences, to complete data string 310.

As described above, it is desirable to be able to replace a data sequence, such as data sequence 112, with another data sequence, such as data sequence 122. The desired result of this edit is data string 320. Edited data string 320 has data sequence 112 replaced by data sequence 122, while data sequences 111 and 113 are unchanged. In the format of the invention, this edit is performed by starting the writing of new second data sequence 122 when the head 250 passes over address marker 312. Address marker 312 is sensed by the clock channel and the head then begins the process to write second data sequence 112, with a timing offset 342, as shown in data string 330. As long as the timing offset between address markers and the start of data sequences (e.g. 331, 332 and 342) is maintained at a constant value, this format accurately edits data sequences, so that the edited data sequence is completely replaced by the new data sequence, and nearby data sequences are not damaged or erased. The method and apparatus for calibrating this timing offset between different edits is described in Sections II–IV.

Figure 4A:
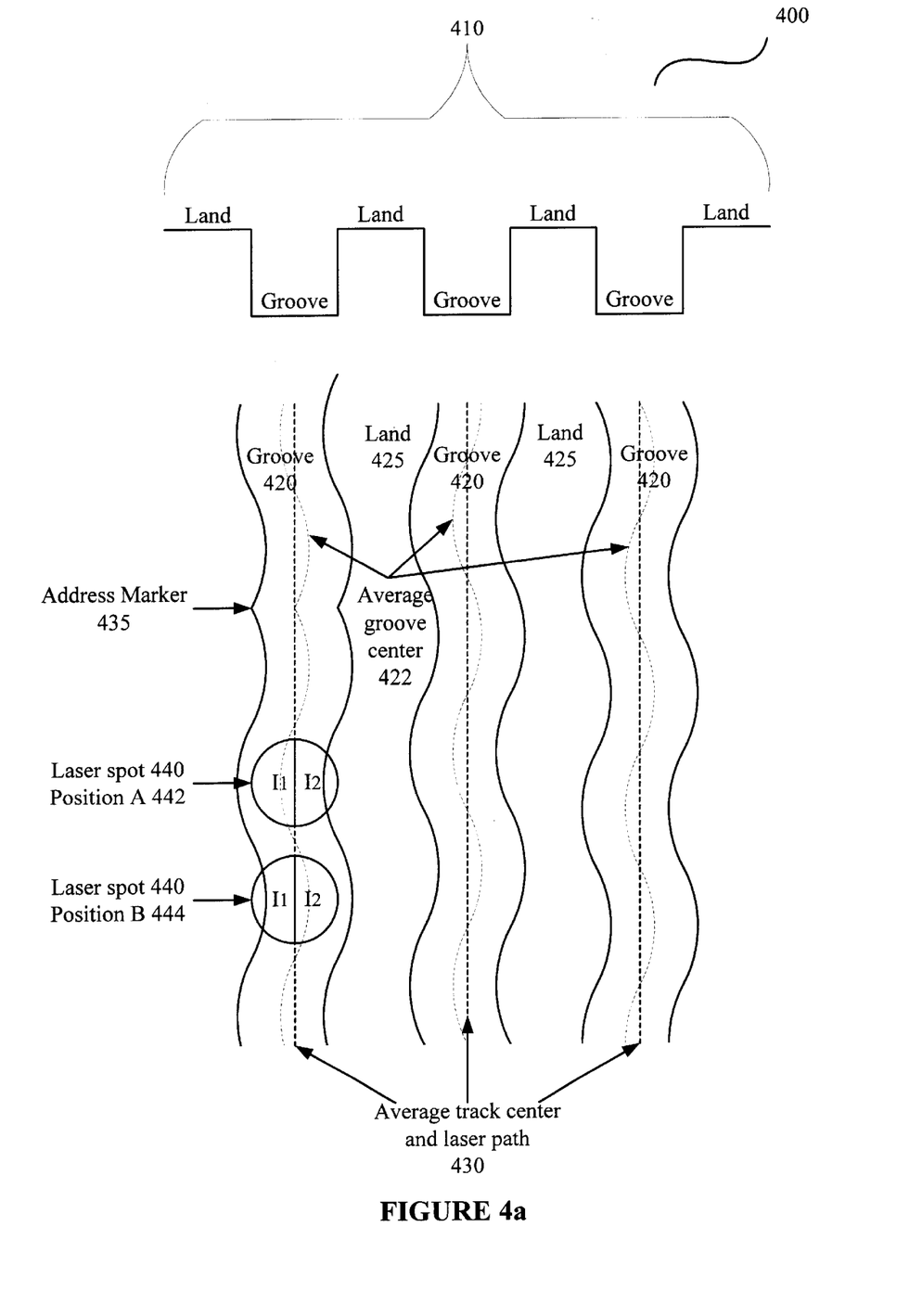
FIG. 4 illustrates the operation of a wobble clock on a DVD disk.
Figure 4B:
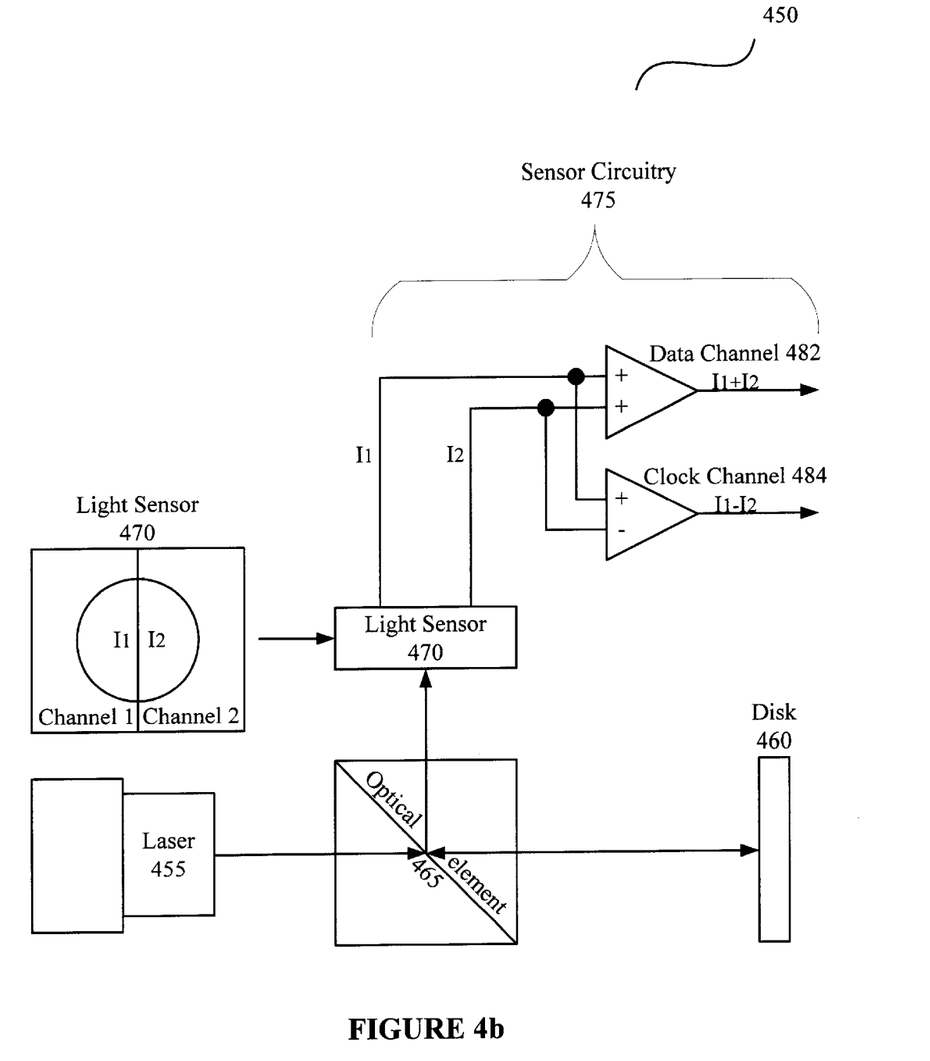

Address markers, such as address markers 311–313 of FIG. 3, must be accurately positioned in known locations on the disk, forming a timing reference (clock) that must be collocated with the data on the disk such that a head 250 can sense their locations during the write process. FIGS. 4a and 4b illustrate the operation of such a clock, wobble clock 400. FIG. 4a shows the disk surface 410, which includes (1) wobble grooves 420, (2) land regions 425, (3) average track centers 430, and (4) a laser spot 440. The wobble grooves 420 and land regions 425 alternate radially, to form the surface of the disk 410. Each groove 420 forms a track upon which data sequences are written. The center 422 of each groove 420 oscillates (wobbles) about an average track center 430, with an amplitude of about 30 nm and a period of about 4.25 $\mu$m. The wobble grooves 420 also include inverted wobbles 424, that abruptly invert the wobble phase at intervals throughout each data block. The presence or absence of an inverted wobble at specific locations represent bits of data. Together these bits carry information such as the address of a block. One such bit identifies the start of the block address information. Such a bit defined by an inverted wobble may also mark the beginning of data files, such as address markers 311, 312 and 313 of FIG. 3.

A laser 455 (see FIG. 4b) is positioned by the servo of a head 450 to maintain a laser spot 440 focussed at the average track center 430 of a groove 420 as shown.

FIG. 4b shows the wobble groove detection circuitry 450, which includes (1) a head 450, (2) a laser 455, (3) a DVD+RW disk 460, (4) an optical phase selection element 465, (5) a light sensor 470, and (6) sensor circuitry 475. Laser 455 is positioned by head 450 to focus a laser spot 440 on disk 460 at the average track center 430 of a groove 420 (see FIG. 4a). Reflected light, from groove 420 and land 425 regions, returns to optical element 465, where transmission to light sensor 470 depends on phase. Light sensor 470 separates the light reflected from each side of the average track center 430 (i.e. regions $I_1$ and $I_2$ shown in FIG. 4a). Reflected intensities from the groove regions 420 of $I_1$ and $I_2$ are converted to electrical signals, and sum and difference measurements are output from circuit 475 through data channel 480 and clock channel 490.

Data channel 480 includes signal $I_1$ 471, signal $I_2$ 472, and summing circuit 485. Summing circuit 485 includes inputs 481 and 482, and output 483. Signal $I_1$ 471 connects to input 481. Signal 12 472 connects to input 482. Data channel 480 operates by first receiving signals $I_1$ and $I_2$ from optical sensor 470, at summing circuit inputs 481 and 482; second, summing signals $I_1$ and $I_2$ at summing circuit 485; and third, outputting the signal $I_1+I_2$ at output 483. The data channel output is a measure of the reflectivity of the section of the disk groove 420 beneath the head laser spot 440 as a function of time. This sum value is not significantly affected by the wobble of the groove 420. Thus, the data channel senses the time when recorded bits pass beneath the head. In this manner, the data channel determines the timing, and hence position of a data sequence on the disk 460. Note that the data channel output 483 is delayed from the actual time a bit passes beneath the head laser spot 440, by the delay of the data channel electronics, so that there is a timing offset between the actual and measured bit positions (described in detail in Section III).

The push-pull tracking channel or clock channel 490 includes signal $I_1$ 471, signal $I_2$ 472, and differencing circuit 495. Differencing circuit 495 includes inputs 491 and 492, and output 493. Signal $I_1$ 471 connects to input 491. Signal $I_2$ 472 connects to input 492. Data channel 490 operates by first receiving signals $I_1$ and $I_2$ from optical sensor 470, at summing circuit inputs 491 and 492; second, subtracting signal $I_2$ from signal $I_1$ at differencing circuit 495; and third, outputting the signal $I_1-I_2$ at output 493. The clock channel 490 output is positive when the center of the laser spot 440 is to the right of the groove center 422, as in Position A 442; and negative when the laser spot center is to the left of the groove center 422, as in Position B 444 (the sign of these outputs could be reversed, depending on the system layout). Thus, the clock channel produces an oscillating output that directly corresponds to the wobble of the grooves. In this manner, the clock channel determines the timing, and hence position of the wobble grooves on the disk, offset by the delay of the clock channel electronics. Note that an abrupt inversion of the phase of the groove center at an inverted wobble 446 in the wobble groove 420 is directly sensed as an abrupt inversion of the oscillating difference output.

II. An Embodiment of Write-timing Calibration.

Figure 5:
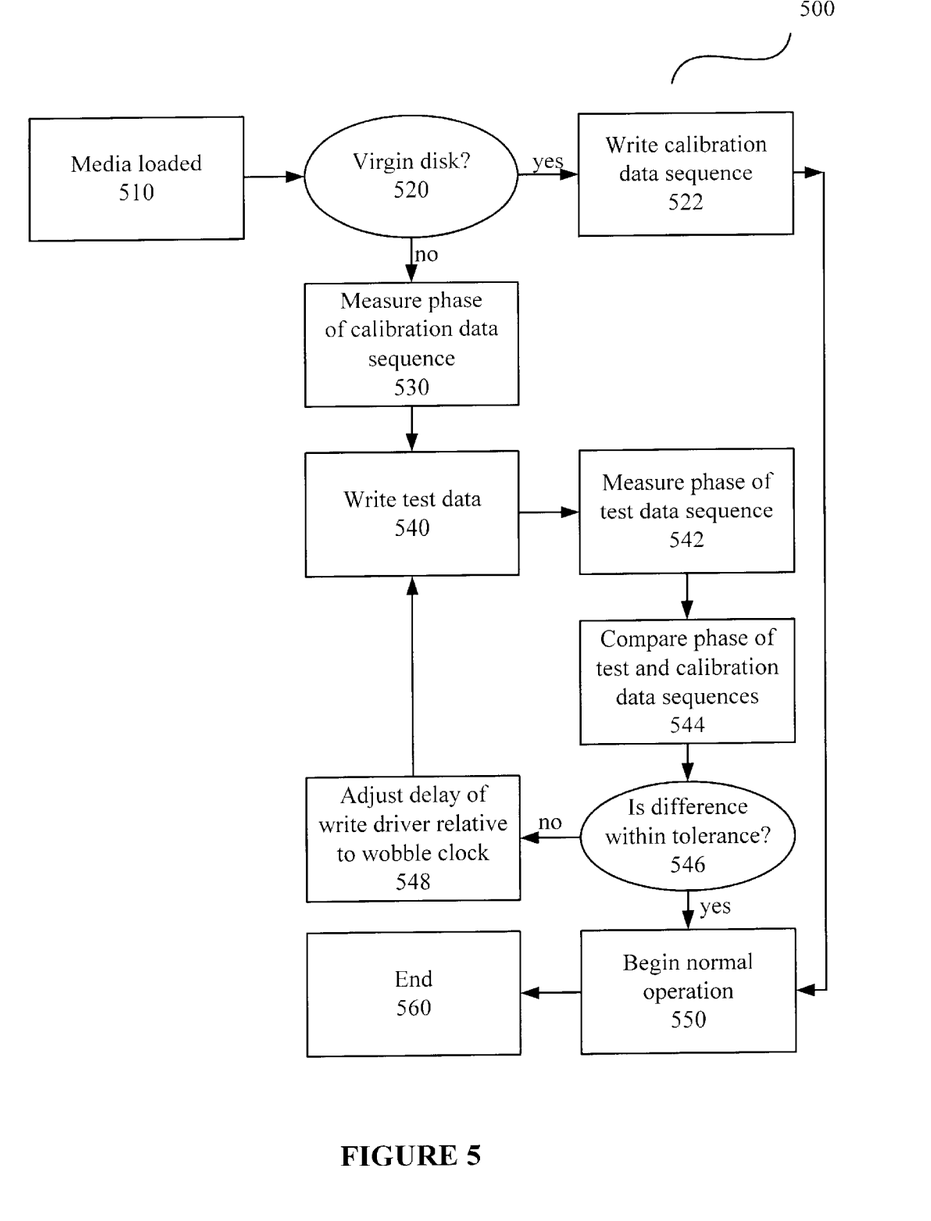
FIG. 5 illustrates a process flow for calibrating write timing.

FIG. 5 shows a flowchart of a process 500 to calibrate the write-timing and position of a data sequence written on a DVD disk.

At 510, a re-writable DVD disk is placed in a read-write capable DVD recorder.

At 520, the recorder checks the formatting to determine whether the disk has been previously formatted and recorded.

If the disk has not been recorded, at 522 the head 450 of the recorder formats the disk and writes a calibration data sequence on the disk, using the disk's wobble clock 400 as a time reference. The calibration data sequence is often written in a special calibration zone on the disk (for example, in the lead-in zone 252). This sequence may be a fixed tone at a harmonic to the frequency of the wobble clock reference, or it may be a pseudo random data sequence. The choice depends on the method used to detect the timing offset of the data relative to the wobble clock (discussed in Section IV).

After writing the calibration data sequence, at 550, the recorder may record data at the same data-to-clock timing offset, until it is deemed necessary to perform a timing-offset calibration (perhaps because of a change in ambient temperature or a time elapsed).

If at 520, the disk had been previously written, then at 530, the head of the recorder reads the calibration data sequence, and measures the timing offset between the beginning of the data sequences (as measured by data channel 482) and the address marker (as measured by clock channel 484). This process is described in detail in Section III.

At 540, the head writes a test data sequence in a zone near the calibration data sequence, using the wobble clock 400 as a time reference. At 542, the head of the recorder reads the test data sequence, and measures a second timing offset between the data channel 482 and the clock channel 484 by the same procedure used for the calibration data sequence. At 544, the measured timing offsets of the calibration and test data sequences are compared. This procedure cancels out the timing offsets of the read process, as will be described in detail in Section III. Thus, the measured difference between the timing offsets of the calibration data sequence and the test data sequence is equal to the actual difference in their timing and hence position with respect to an address marker 435 of the wobble clock 400.

At 546, the recorder determines whether the measured write-timing offsets of the test data sequence and the calibration data sequence are the same within a tolerance. If the write-timing offsets are not the same, the timing of the test data sequence write process is advanced or delayed according to the measured difference in the timing offsets. Then, at 540, a new test data sequence is written, and steps 542, 544 and 546 are repeated. If the measured timing offsets between (1) the calibration data sequence and the wobble clock and (2) the test data sequence and the wobble clock are the same within the specified tolerance, then the actual physical location of the start of new data sequences will match that of the old data sequences, within a corresponding tolerance.

This calibration should be carried out at all potential write speeds.

Then, at 550, the recorder may record and edit data until it is deemed necessary to perform another calibration.

III. An Embodiment of Determining a Timing Offset

Figure 6:
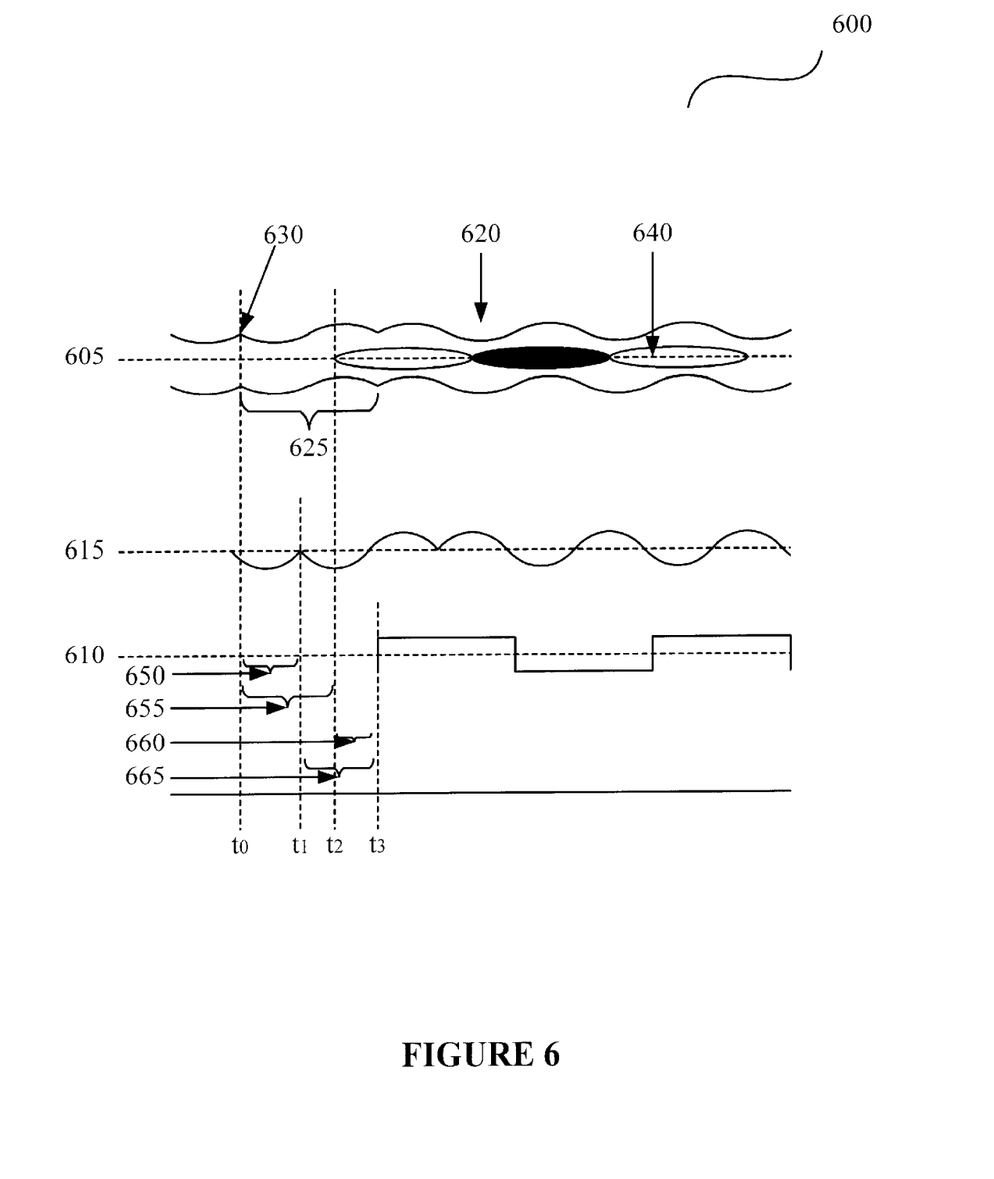
FIG. 6 illustrates timing offsets between a data sequence and a wobble clock.

FIG. 6 illustrates a time line 600 of the position of head 450 on data track 605, and the corresponding output of the digitized data channel 610 and the clock channel 615. Data track 605 includes a wobble groove 620, an inverted wobble 625, an address marker 630, and a "constant tone" oscillating data sequence 640, with the same period or "run length" as the wobble groove 620.

The head 450 passes the address marker 630 at a time $t_0$. The clock channel 615 senses the abrupt inversion of the groove wobble, and outputs a corresponding change in the oscillating signal at time $t_1$, after a processing time delay as shown. Thus, there is a clock channel electronics timing offset $t_1-t_0$ 650 between the actual and measured times that the head 450 passed the address marker 630.

There is a timing offset $t_2-t_0$ 655 between the address marker 630 and the beginning of a data sequence 640 as previously described.

The head 450 passes the beginning of data sequence 640 at a time $t_2$. The data channel 610 senses the beginning of the first bit and begins to output an oscillating signal at $t_3$, after a different processing delay as shown. Thus, there is a data channel timing offset $t_3-t_2$ 660 between the actual and measured times that the head 450 passed the beginning of data sequence 640.

During readback of data track 605 by the data and clock channels 610 and 615, the measured time between the address marker 630 and the beginning of the data sequence 640 is $t_3-t_1$ 665. This offset 665 between the data and clock channels is a value that can be measured. However, the measured timing offset 665 is equal to the actual write-timing offset 655 plus the difference between the delays 660 and 650 of the data channel 610 and clock channel 615 respectively. That is, measured offset 655, $t_3-t_1=(t_2-t_0)+(t_3-t_2)-(t_1-t_0)$. The data channel offset $(t_3-t_2)$ 660 and clock channel offset $(t_1-t_0)$ 650 can vary, and are generally not known during the recording process. Therefore, the actual offset, $(t_2-t_0)$ 655, between an address marker and the beginning of a recorded data sequence, is not determined. Thus, reading a written track is insufficient to calibrate the write-timing offset 655 for writing a new data sequence. This calibration error can be particularly large when using a head with different delay times than the head used to write the original data sequences.

However, calibration process 500 effectively calibrates the write delay for writing to a DVD+RW disk, by any compatible recorder and head. Step 530 of FIG. 5 measures $(t_3-t_1)_{cal}=(t_2-t_0)_{cal}+(t_3-t_2)_{recorder}-(t_1-t_0)_{recorder}$ of the calibration data sequence. $(t_3-t_1)_{cal}$ and $(t_2-t_0)_{cal}$ are the measured and actual time offsets respectively, of the calibration data sequence, as measured by an editing recorder. $(t_3-t_2)_{recorder}$ and $(t_1-t_0)_{recorder}$ are the data and clock channel timing offsets of the recorder. Using the same recorder as in Step 530, Step 542 of FIG. 5 measures $(t_3-t_1)_{test}=(t_2-t_0)_{test}+(t_3-t_2)_{recorder}-(t_1-t_0)_{recorder}$ of the test data sequence. $(t_3-t_1)_{test}=(t_2-t_0)_{test}$ are the measured and actual time offsets respectively, of the test data sequence. $(t_3-t_2)_{recorder}$ and $(t_1-t_0)_{recorder}$ are the data and clock channel timing offsets of the recorder. Step 544 subtracts $(t_3-t_1)_{cal}$ from $(t_3-t_1)_{test}$ to compare the calibration and test data sequence offsets. The recorder's data and clock channel offsets cancel, as well as the calibration set-point position of the address marker, t1. This leaves a direct measure of the offset between the start of the calibration and test data sequences $(t_3)_{test}-(t_3)_{cal}$, with respect to an address marker. When this difference is small, edited data sequences will be accurately positioned to overwrite selected old data sequences.

The relationship between position offsets and timing offsets depends upon the velocity of the head. The effect of, for example, channel electronics upon the timing offset may not have the same dependence on the velocity of the head. Therefore, it may be necessary to perform the calibration process over a range of speeds.

IV. Embodiments of Measuring the Timing Offset

The timing offset between two channels with outputs oscillating at the same frequency (or a harmonic), such as data channel 610 and clock channel 615, can be determined from their phase offset $(\Delta\phi)$. The timing offset, $\Delta t=\Delta x/v=B/(v*\pi)*\Delta\phi$, where $\Delta x$ is the offset in distance, v is the head velocity with respect to the disk, B is the length of a bit, and $\phi$ is the phase in radians. The phase determination embodiment of measuring a timing offset is advantageous because it is fast, and employs relatively simple electronics.

Figure 7:
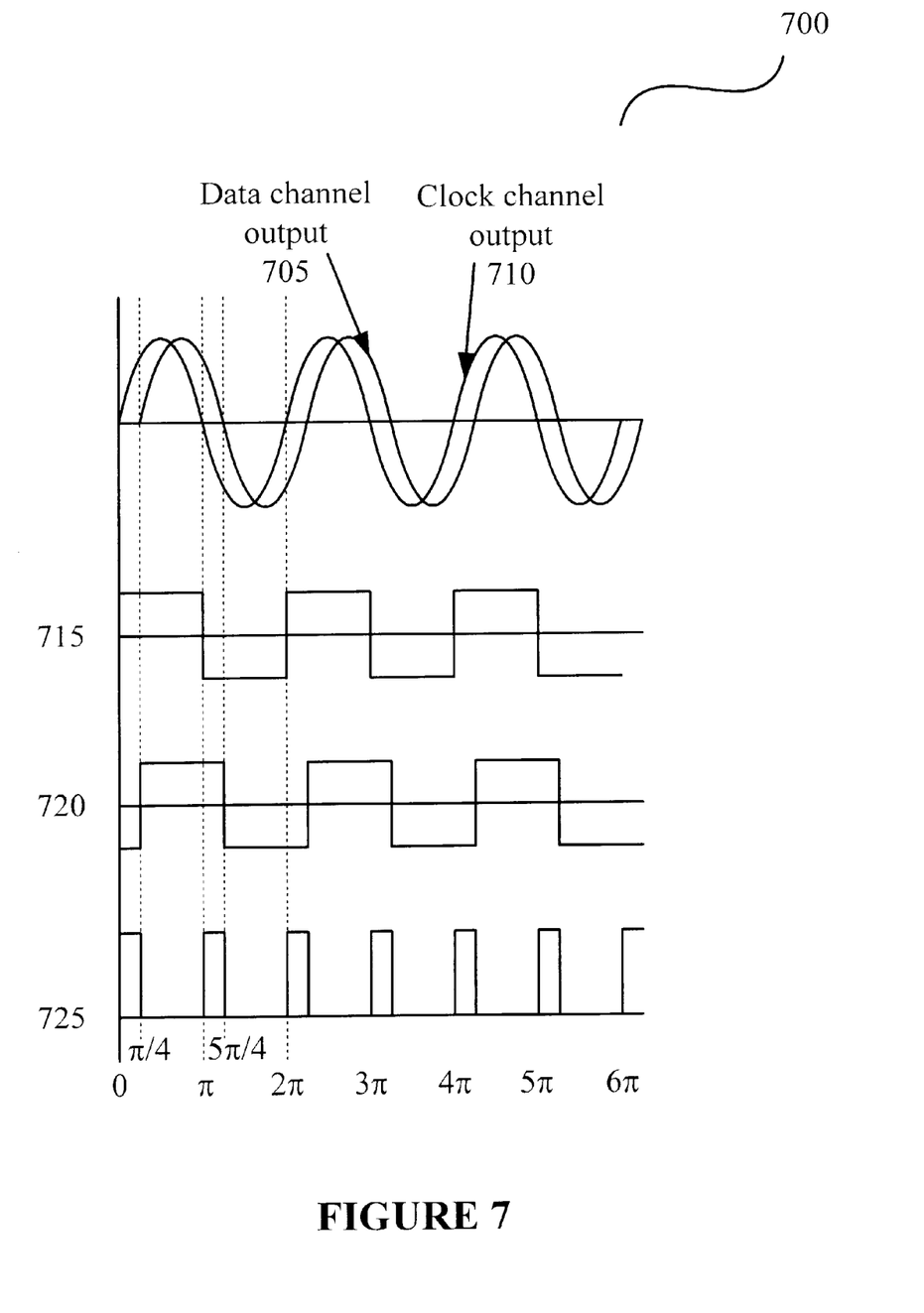
FIG. 7 illustrates measurement of timing offsets between a data sequence and a wobble clock.

FIG. 7 illustrates an embodiment of the phase determination method 700, which employs (1) a data channel output signal 705, (2) a clock channel output signal 710, (3) a signal measuring the sign of the data channel output 715, (4) a signal measuring the sign of the clock channel output 720, and (5) a filtered XOR gate output 725. The sign of the data channel 715 and the sign of the clock channel 720 are the inputs to the XOR gate that produces output 725.

Phase determination method 700 proceeds as follows. The data channel 480 and clock channel 490 output oscillating signals having a time offset, and hence a phase offset. The oscillating signals (which may have other functional forms, such as a square wave shown in FIG. 6) are represented by sinusoidal signals 705 and 710 respectively. The data channel output 705 is converted (e.g. by using a comparator) to a square wave 715, having a constant positive value when the sign of sinusoid 705 is any positive value and a constant negative value when the sign of sinusoid 705 has any negative value. The clock channel output 710 is similarly converted to square wave 720. Square wave signals 715 and 720 are used as inputs to a digital mixer such as an XOR gate. A similar process can employ an analog mixer or a Time Interval Analyzer, TIA. The XOR gate outputs a constant positive value when one but not both of inputs 715 and 720 are positive. Otherwise, the XOR gate output is zero. This XOR gate output 725 is a measure of the phase difference between the data channel 705 and the clock channel 710. For example, when there is no phase offset between outputs 705 and 710, the square wave signals 715 and 720 superimpose. In this case, the inputs to the XOR gate never have one positive value and one negative value. Thus, the XOR gate output 725 is always zero. When the phase offset between outputs 705 and 710 is pi radians, the values of square wave signals 715 and 720 are always opposite. In this case, the inputs to the XOR gate always have one positive value and one negative value, so the XOR gate output 725 is always a constant positive value. When the phase offset between outputs 705 and 710 is a fraction of pi radians, the values of square wave signals 715 and 720 are opposite for that same fraction of the total of each oscillation cycle. In this case, the XOR gate output 725 is a constant positive value for part of each cycle as shown in FIG. 7. In this manner, the phase delay can be determined as a fraction of pi by, for example, comparing the integrated average output value of XOR gate 725 to the constant positive output value. A calibration using calibration process 500 can be achieved by measuring the output values of XOR gate 725 upon reading the calibration and test data sequences, and iterating the write-timing until these output values differ by less than a defined tolerance.

When the data channel outputs 705 result from pseudo-random calibration and test data sequences, the timing offset between two channels, such as data channel 610 and clock channel 615, can still be determined. One embodiment of measuring the timing offset from pseudo-random data sequences employs direct determination of the timing offset between the sensing of specific bits. The direct determination embodiment requires more sophisticated electronics than the phase determination embodiment, but is advantageous because any recorded data sequence may be used as a calibration data sequence.

A calibration, following calibration process 500, can be achieved using the direct determination method as follows. A calibration data sequence is read, and the timing offset of one or several zero crossings with respect to an address marker is measured. A copy of the calibration data sequence is then written as a test data sequence, and the timing offset of one or several zero crossings with respect to an address marker is measured. The measured timing offsets of the calibration and test sequences are then compared, and the write-timing is adjusted until the timing offsets differ by less than a defined tolerance.

This method and apparatus to calibrate the write-timing of DVD recorders described above has several advantages over the prior art. It calibrates the timing of the process that writes new data sequences, so that the new data sequences have the same offset relative to reference marks on the disk as old data sequences. This process does not require information about the apparatus used to record the old data. It calibrates the timing of bits written on DVD formats by different recording devices so that the start position of edited data sequences is repeatably collocated with previous data sequences to a precision better than +/−0.06 $\mu$m. This process enables editing of data without erasure of or damage to nearby data files. The DVD disks using this process can be conveniently read by prior art DVD-ROM and other recording devices.

The foregoing has described new methods and apparatus for calibrating write timing of digital video disks. Although the invention is described with respect to a preferred embodiment, modifications thereto will be apparent to those skilled in the art. It is contemplated that changes and modifications may be made to the materials and arrangements of elements of the present invention without departing from the scope of the invention. Therefore, the scope of the invention is to be determined by reference to the claims that follow.

I claim:

1. A method of calibrating timing of recorded data, said method comprising:
   a) recording a calibration data sequence on a storage medium referenced to a timing reference on the storage medium;
   b) measuring a first timing offset between said calibration data sequence and said timing reference;
   c) writing a test data sequence;
   d) measuring a second timing offset between said test data sequence and said timing reference; and
   e) comparing said first timing offset of said calibration data sequence and said second timing offset of said test data sequence with respect to said timing reference.

2. The method as claimed in claim 1, further comprising:
   f) correcting the timing of said writing a test data sequence so as to reduce the difference between the first timing offset of said calibration data sequence and said second timing offset of said test data sequence.

3. The method as claimed in claim 1, further comprising:
   g) iteratively repeating steps c, d, e and f, until said first timing offset of said calibration data sequence and said second timing offset of said test data sequence with respect to said timing reference are equal to within a defined tolerance.

4. The method as claimed in claim 1, further comprising:
   h) adjusting the timing of the process for said writing a test data sequence relative to said timing reference by the amount necessary for said first timing offset of said calibration data sequence and said second timing offset of said test data sequence with respect to said timing reference to be equal to within a defined tolerance.

5. The method as claimed in claim 1 wherein said storage medium comprises one of a DVD disk, a CD disk, an optically assisted magnetic storage disk, and a magnetic storage disk.

6. The method as claimed in claim 1 wherein said timing reference comprises a wobble clock.

7. The method as claimed in claim 1, wherein said calibration data sequence is recorded by a first recording device and said test data sequences are recorded by one of the first recording device and a second recording device.

8. The method as claimed in claim 1, wherein said calibration data sequence comprises a data sequence recorded in one of a data zone of the storage medium, a lead-in calibration zone of the storage medium and a lead-out calibration zone of the storage medium.

9. The method as claimed in claim 1, wherein said calibration data sequence comprises one of a constant tone data sequence with the same frequency as the timing reference, a constant tone data sequence with a frequency that is a harmonic of the timing reference frequency, a pseudo-random data sequence and a data sequence containing previously recorded information.

10. The method as claimed in claim 1 wherein steps (c), (d), and (e) are performed for at least two recording speeds.

11. An apparatus for calibrating the timing of a write process, said apparatus comprising:
    a recording medium;
    a timing reference including of a series of positions marked on said recording medium;
    a calibration data sequence recorded on said recording medium;
    a recording device that senses data sequences and said positions marked on said recording medium;
    a device that measures when said recording device senses said data sequences and said positions marked on said recording medium;
    a first module to measure a first timing offset between sensing of said calibration data sequence and one of said positions marked on said recording medium;
    a second module to write a test.data sequence with said recording device, in response to sensing another of said positions marked on said recording medium;
    a third module to measure a second timing offset between sensing of said test data sequence and sensing of said another of said positions marked on said recording medium; and
    a fourth module to compare the first timing offset between sensing of said test data sequence and sensing of said another of said positions marked on said recording medium, and the measured second timing offset between sensing of said calibration data sequence and said one of said positions marked on said recording medium.

12. The method as claimed in claim 11, said method further comprising:
    a fifth module to determine whether the time difference between said compared timing offsets is less than a specified value.

13. The method as claimed in claim 11, said method further comprising:
    a sixth module to change the timing of said write process in response to sensing one of said timing reference positions on the recording medium, by an amount determined by said time difference determined by said fifth module.

14. The apparatus as claimed in claim 11 wherein said write process comprises a process to record data on a disk storage medium.

15. The apparatus as claimed in claim 14 wherein said disk storage medium comprises one of a DVD disk, a CD disk, an optically assisted magnetic storage disk, and a magnetic storage disk.

16. The apparatus as claimed in claim 11 wherein said timing reference comprises a wobble clock.

17. The apparatus as claimed in claim 11 wherein said calibration data sequence is recorded by a first recording device and said test data sequences are recorded by one of the first recording device and a second recording device.

18. The apparatus as claimed in claim 11 wherein said calibration data sequence comprises a data sequence recorded in one of a data zone of the recording medium, a lead-in calibration zone of the recording medium and a lead-out calibration zone of the recording medium.

19. The apparatus as claimed in claim 11 wherein said calibration data sequence comprises one of a constant tone data sequence with a same frequency as the timing reference, a constant tone data sequence with a frequency that is a harmonic of the timing reference frequency, a pseudo-random data sequence and a data sequence containing previously recorded information.

20. The apparatus as claimed in claim 11 wherein said calibrating timing of recorded data is performed for at least two recording speeds.

* * * * *